T. H. STEPHENSON.
INSTANTANEOUS HOT WATER HEATER.
APPLICATION FILED FEB. 25, 1911.
1,016,044.
Patented Jan. 30, 1912.
3 SHEETS—SHEET 1.
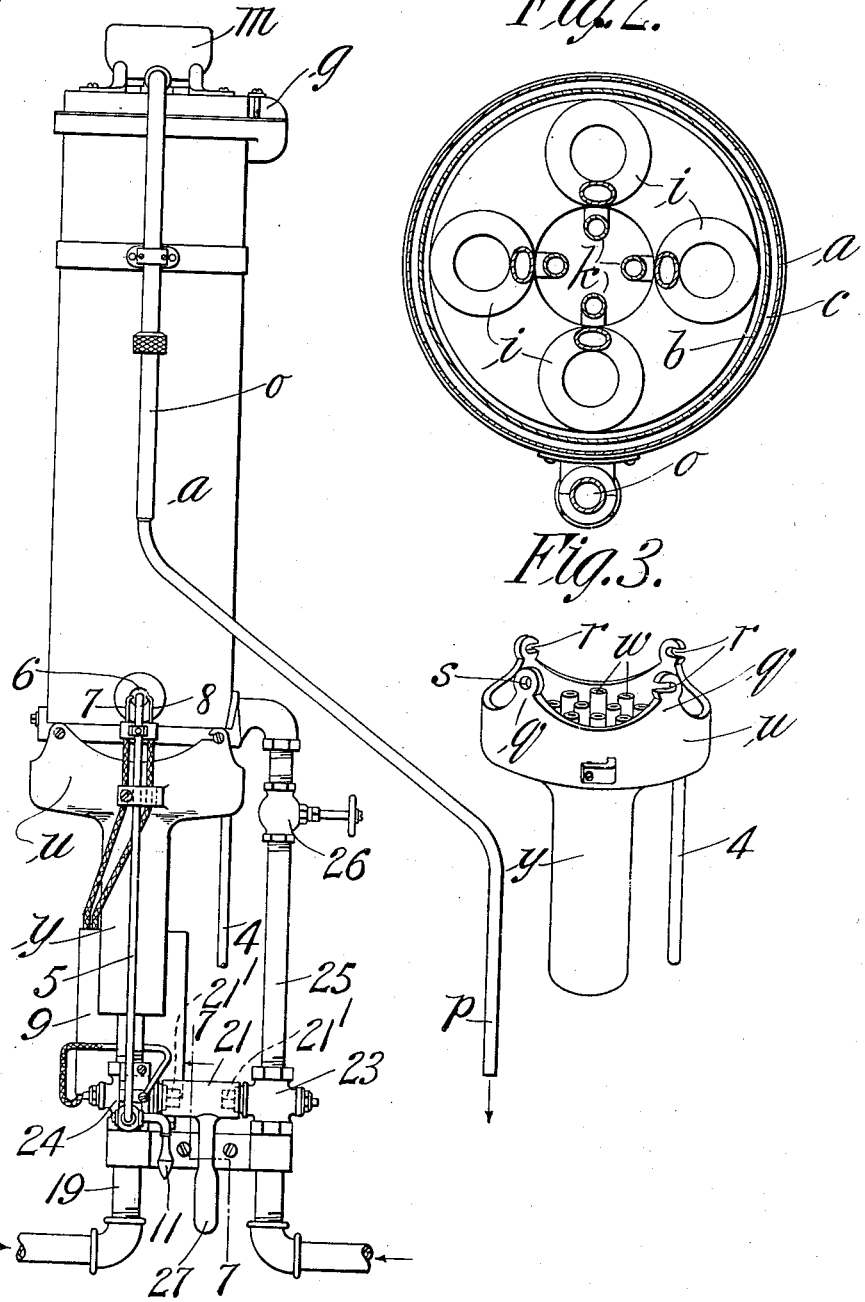
WITNESSES:
H. L. Sprague
Harry W. Bowen
INVENTOR,
Thomas H. Stephenson,
BY
Chapin & Co.
ATTORNEY.

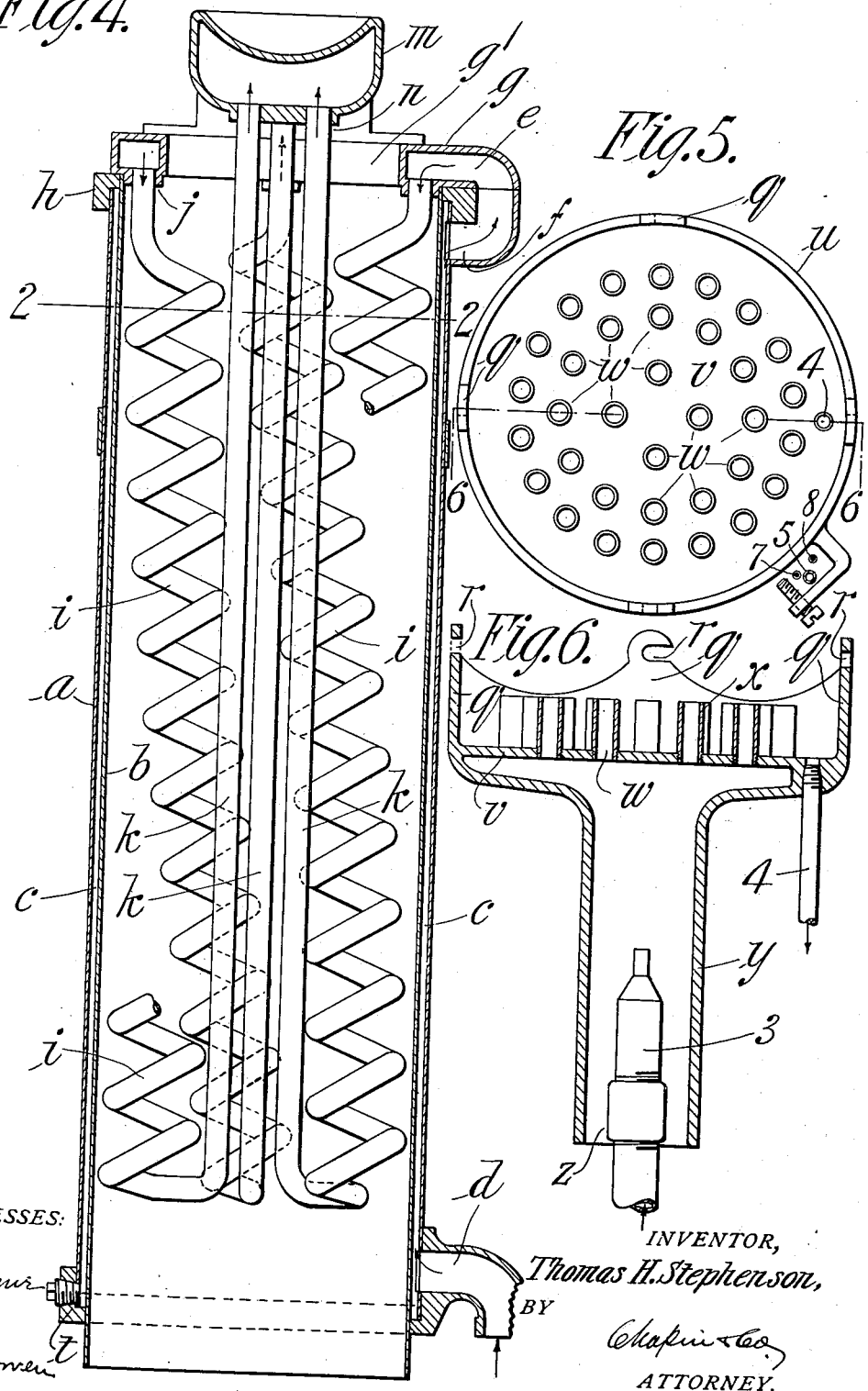

T. H. STEPHENSON.
INSTANTANEOUS HOT WATER HEATER.
APPLICATION FILED FEB. 25, 1911.

1,016,044.

Patented Jan. 30, 1912.
3 SHEETS—SHEET 3.

WITNESSES:
H. L. Sprague
Harry W. Bowen

INVENTOR,
Thomas H. Stephenson,
BY
Chapin & Co.
ATTORNEY.

UNITED STATES PATENT OFFICE.

THOMAS H. STEPHENSON, OF HOLYOKE, MASSACHUSETTS.

INSTANTANEOUS HOT-WATER HEATER.

1,016,044.  Specification of Letters Patent. Patented Jan. 30, 1912.

Application filed February 25, 1911. Serial No. 610,694.

*To all whom it may concern:*

Be it known that I, THOMAS H. STEPHENSON, a citizen of the United States of America, residing at Holyoke, in the county of Hampden and State of Massachusetts, have invented new and useful Improvements in Instantaneous Hot-Water Heaters, of which the following is a specification.

This invention relates to improvements in instantaneous hot water heaters in which a plurality of coiled pipes, through which water flows, are subjected to the heat from a gas burner.

The objects of my invention are,—1st: to provide a heater in which the incoming cold water is subjected to an initial warming or heating, before it enters the coiled pipes; 2d: to so arrange the flow of the incoming water that it serves as a jacket to the heater to utilize and prevent as much as possible wasting the heat from the burner; 3d: to provide an electric ignition device for the pilot light for the burners; 4th: to provide means for maintaining the main gas and water valves locked against movement until after the pilot light is ignited; 5th: to provide a burner for the heater in which there is a thorough mixture of the gas and air before the mixture reaches the burner-tips; 6th: to provide means for quickly detaching the burner from the casing portion of the heater.

Figure 7:
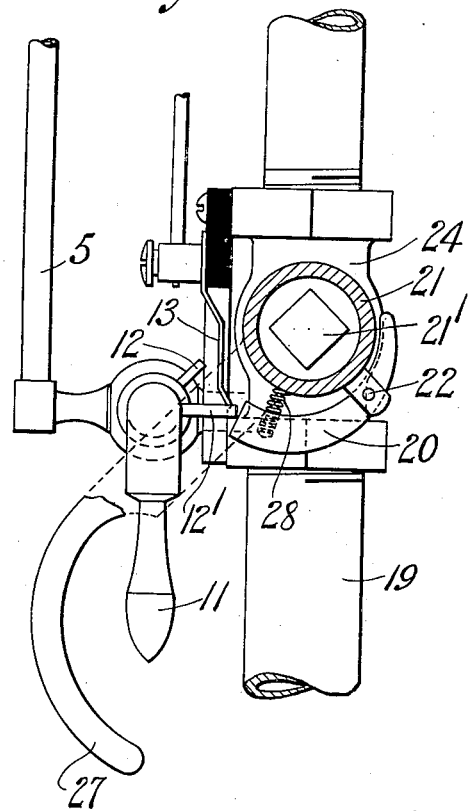
Figure 8:
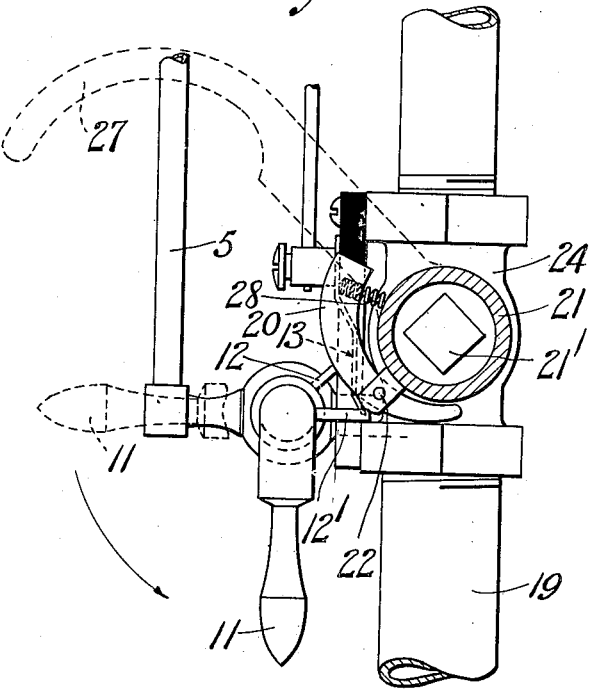
Figure 9:
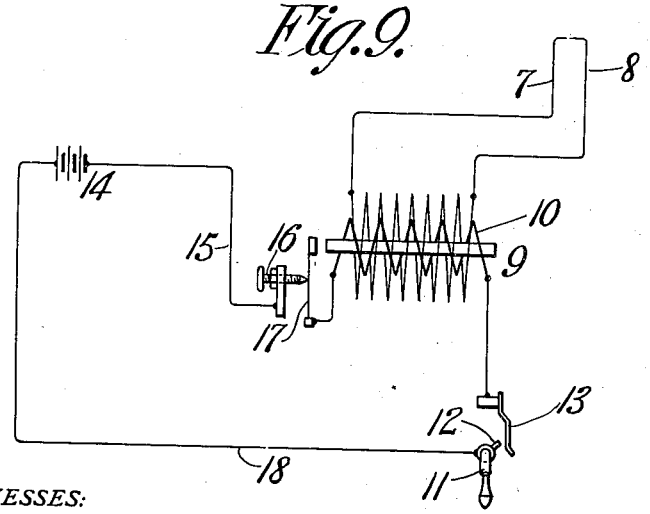

Other objects will appear in the body of the specification and will particularly be pointed out in the claims. I attain these objects by means of the construction illustrated in the accompanying drawings, in which,—Figure 1 is a view, in elevation, of the heater showing the pipe connections, electric ignition devices, and the hot water delivery pipe. Fig. 2 is a transverse, horizontal view, in section, on the line 2—2 of Fig. 4 showing the inclined position of the delivery end of the coils, and their arrangement within the shell of the heater. Fig. 3 is a detail, perspective view of the burner clearly illustrating the slotted ears for quickly detaching the same from the shell. Fig. 4 is a vertical view, in section, through the axis of the shell, showing some of the coils in elevation, their attachment at the upper ends to the water-distributing head, the water jacket, and the inlet thereto. Fig. 5 is a plan view of the burner. Fig. 6 is a vertical, sectional view on the line 6—6, Fig. 5. Fig. 7 is an enlarged, transverse, sectional view of the valve operating device looking in the direction of the arrow, and with the operating handle down in a closed position. Fig. 8 is a view similar to Fig. 7 but showing the handle raised, after the pilot lamp has been ignited by the electric system. Fig. 9 is a diagram of the electric ignition device for the pilot lamp.

In the drawings forming part of this application, $a$ designates the outer shell of the heater; $b$ the inner shell which is spaced from the outer shell $a$ to form an annular water jacket or space $c$ in the space between the two shells. This annular water jacket $c$ communicates at its lower end with a supply pipe $d$, while its upper end opens into an annular chamber $e$, (as shown at $f$) which is formed within a cap member $g$ which engages a ring $h$ that is secured to the upper end of the outer and inner shells $a$ and $b$, as shown, and has an opening $g^1$ therethrough for the passage of the products of combustion and the discharge end of the heating coils. Brazed, or otherwise secured to the cap member $g$, at their upper or discharge ends, are a plurality of coiled tubular members $i$ which are arranged in an inclined position within the inner shell or casing $b$, their point of attachment to the cap member $g$ being indicated at $j$. The lower ends of the coils $i$ are continued upward through the center portion of the heater in an inclined position, as shown at $k$ (see Fig. 2) and are connected to the delivery or discharge cap-piece $m$, as shown at $n$. The interior of the cap-piece $m$ leads to a delivery pipe $o$ to which a swinging delivery end-piece $p$ is attached so that the flow of hot water can be directed either to the right or the left side of the pipe $o$.

Referring now to the construction of the gas burner which is attached to the lower end of the casing $a$ by means of the ear pieces $q$, three of which, it will be noticed, are provided with slots $r$, and the other one with the perforation $s$. This construction permits the enlarged bowl part $u$ of the heater to be readily attached to, and detached from, the casting at the bottom portion of the casing $a$, which is designated by the letter $t$. The upper portion of the burner is made larger in diameter than the lower portion, as clearly illustrated in Figs. 3 and 6, and is provided with a partition plate $v$ having openings therein, as shown at $w$, in which is secured the tubular burner tips $x$. The lower portion of the burner is contracted toward the axis, as shown at $y$, and is made of considerable length in order to thoroughly mix the gaseous fluid with the incoming air which enters the lower part of the contracted portion at $z$. 3 designates the pipe which furnishes the supply of gaseous fuel. From the construction of this burner it will be seen that by reason of the long contracted portion $y$, the combustible mixture is thoroughly commingled before it reaches the burner-tips $x$ thus effecting a great saving in the use of gas, as the right proportions are brought together for utilizing all of the combustible material of the gaseous fuel.

4 designates the drip-pipe that is designed to carry away any condensed moisture which may accumulate on the inside of the casing $b$, or within the burner when the heater is in use. The bowl part $u$ is also large enough, diametrically, to carry away any of the water of condensation that may accumulate and run down on the outside of the casing $a$.

Referring now to the ignition device, by means of which the pilot lamp is ignited: 5 designates a small tube for conveying the gas that leads upward to the lower part of the casing $a$ and its upper end terminates adjacent an opening 6 which leads to the interior of the casing which contains the heating coils $i$. 7 and 8 designate two spark terminals that are connected with the secondary winding of an induction coil, as shown in diagram in Fig. 9. Interposed in the primary winding 10 is a make and break device which consists of a handle 11 having a pin 12 thereon which is adapted to make contact with the flexible strip 13 by closing the primary circuit in the usual manner. The battery is designated at 14,—one terminal of which is connected, by means of the wire 15, to the set-screw 16 which bears against the vibrator 17 and to which one terminal of the primary winding 10 is connected. The terminal of the battery 14 is connected by means of a wire 18 to a handle 11. By rotating the handle 11, so as to cause the pin 12 to engage the strip 13, the ignition sparks are produced between the points 7 and 8 and at the same time the gas is turned into the small pilot pipe 5 which leads upward to the opening 6, as stated above. This pipe communicates with the gas main 19 and when the gas reaches the opening 6 it will be instantly ignited by the electric sparks. The pressure in the main causes the pilot flame to be blown inside of the casing $b$ and above the tip burners $x$ so that when the main supply of gas is turned onto the main burner, they will all be simultaneously ignited. $12^1$ designates a second pin attached to the handle 11, and is designed to lock the main valves against movement until after the pilot lamp is lighted.

It will be noticed that the pin $12^1$, shown in Fig. 7, normally lies in contact with the end of the locking cam 20 which is pivotally attached to a barrel member 21 at the point 22. The opposite ends of the barrel member 21 are socketed, as shown at $21^1$, to receive the squared ends of the plugs of the valves 23 and 24, the latter controlling the supply of water to the pipe 25 which communicates with the part $d$ (see Fig. 4) and interposed in this pipe between the valve 23 and the part $d$ is the shut-off 26. The valve 24 controls the supply of gas to the supply pipe 3 which is located at the lower end of the burner. Attached to the barrel member 21 is an operating lever 27 so that when the lever is moved upward, as shown in Fig. 8, the main water and gas valves 23 and 24, will be simultaneously operated to turn on the water that is to be heated and open the main supply of gas for the burners $x$.

The position of the parts shown in Fig. 7 shows the main operating handle 27 in its closed position, while that shown in the dotted line position in Fig. 8 is in an open position. It will be noticed that the cam 20 is normally pressed outward by means of the spring 28, after the pilot lamp has been lighted, by the operator moving the handle 11 from the position shown in Fig. 7 to that shown in Fig. 8, whereby the pin $12^1$ is moved away from the end of the cam 20. The barrel element 21 may then be rotated by the handle 27, simultaneously turning on the flow of the gas and water, which are controlled by the valves 23 and 24. The pin 12, in wiping across the strip 13, ignites the pilot lamp and afterward is moved to the open circuit position, shown in Fig. 8. When it is desired to shut off the flow of water and gas the handle 27 is depressed back to the position shown in Fig. 7, the end of the cam 20 simply snapping over the pin $12^1$ and compressing the spring 28, after the valve handle 11 has been turned to the shut-off position shown in Fig. 7 with the pin $12^1$ engaging the end of the cam 20. It will be observed from the arrangement of the coils $i$ and the plate $v$ that any water of condensation that may form on these pipes will drip back onto the plate $v$ where it will be carried off by the discharge pipe 4. It will also be noticed that the upper part of the burner is large enough, diametrically, to receive any drippings that may form on the outside of the outer shell $a$. These drippings may be also carried away by the pipe 4.

From the foregoing description, it will be seen that I have produced a very efficient and simple hot water heater, and one that utilizes to a very large degree practically all of the heat from the gaseous fuel, and at the same time maintains the outer walls cool by initially heating the incoming water from the mains; also that I have successfully provided for the drippings which arise from the moisture or condensation on the heating pipes and outer casing member.

It will be seen that the water to be heated enters at $d$, passes upward in the space $c$ to the annular chambered member $g$, where it flows downward through the coils $i$, then upward through the pipes $k$ to the discharge cap $m$, and from thence to the pipes $o$ and $p$. The heated air in the inner casing thus comes in contact with the heating coils $i$ throughout their length, as well as with the discharge pipes $k$.

What I claim, is:—

1. In a hot-water heater, the combination with two casing members arranged in concentric relation to each other for providing an annular chamber in which the water to be heated enters the upper end of the casing communicating with a cap member provided with an annular passage-way, a plurality of heating coils arranged within the inner casing and having one end of the coils in communication with the annular passageway, and their discharge end opening into a second cap member from which the heated water is delivered, a burner attached to the lower end of the annular casing, means for carrying away the water of condensation which may form on the coils and the inside of the inner casing member.

2. In a hot water heater, a plurality of casings spaced from each other, a heater located below the casing, coils located within the heater and having direct communication with the space between the casings, an annular cap member having an opening therethrough and located at the upper ends of the casings to which the discharge ends of the coils are connected, whereby the heated air and products of combustion will flow in direct contact with the cap member and the discharge ends of the coils during their escape, as described.

3. In a hot water heater, the combination with casing members radially spaced from each other to provide an annular space for the incoming cold water to initially heat the same before it enters the heating coils, a chambered member with which the upper outlet end of the annular space communicates, the inlet ends of said heating coils being attached to, and in communication with, the chambered member, the coils extending downward from the chambered member and then upward, a discharge cap-piece with which the outlet ends of the heating coils are connected, and a burner for heating the coils.

4. In a hot water heater, the combination with casing members radially spaced from each other to provide an annular space for the incoming cold water to initially heat the same before it enters the heating coils, a chambered member with which the upper outlet end of the annular space communicates and into which the initially heated water discharges, the inlet ends of said heating coils being attached to, and in communication with, the chambered member, the coils extending downward from the chambered member and then upward, the chambered member having an opening through which the discharge ends of the heating coils extend and the heated products of combustion pass, and a burner for heating the coils, substantially as described.

THOMAS H. STEPHENSON.

Witnesses:
WILLIAM H. CHAPIN,
HARRY W. BOWEN.